Dec. 9, 1947.          D. E. NORGAARD          2,432,330
LOCATING EQUIPMENT
Filed Feb. 18, 1944          2 Sheets-Sheet 1
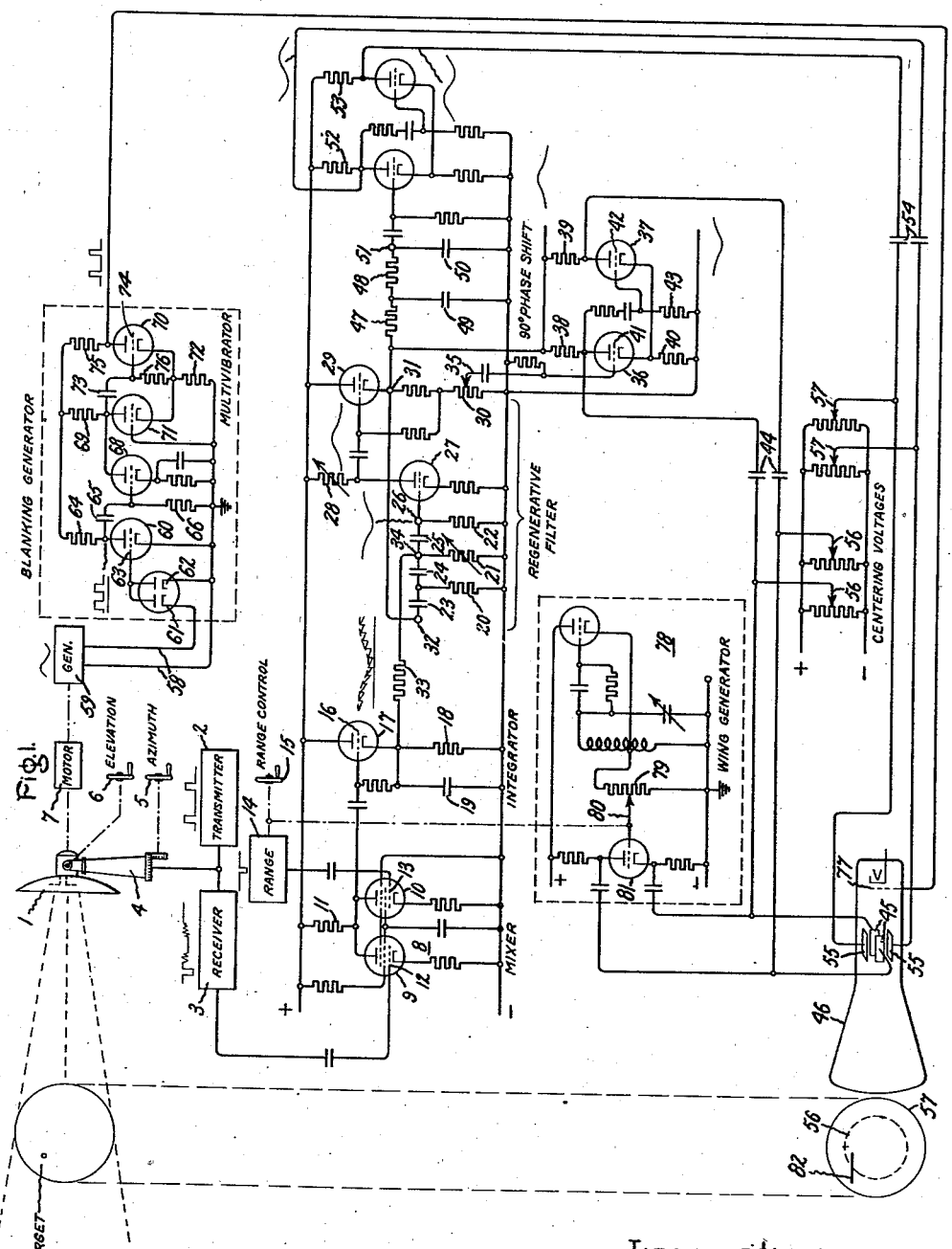
Inventor:
Donald E. Norgaard,
by Harry E. Dunham
His Attorney.

Dec. 9, 1947.  D. E. NORGAARD  2,432,330
LOCATING EQUIPMENT
Filed Feb. 18, 1944  2 Sheets-Sheet 2
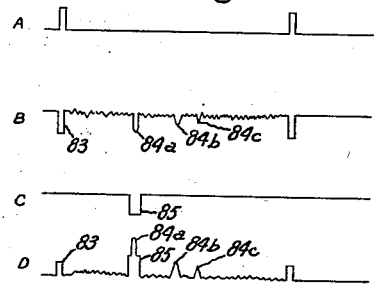
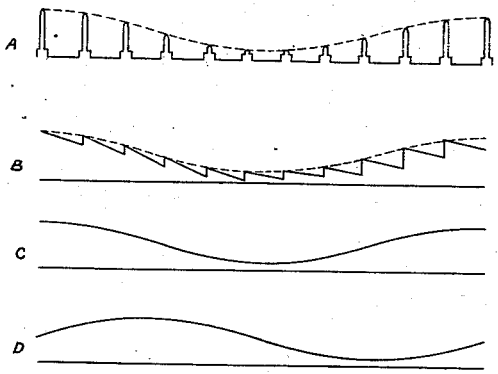
Inventor:
Donald E. Norgaard,
by Harry E. Dunham
His Attorney.

Patented Dec. 9, 1947

2,432,330

UNITED STATES PATENT OFFICE 2,432,330

LOCATING EQUIPMENT

Donald E. Norgaard, Scotia, N. Y., assignor to General Electric Company, a corporation of New York Application February 18, 1944, Serial No. 522,859

5 Claims. (Cl. 250—11)

The present invention relates to locating equipment and is particularly concerned with equipment for indicating the accuracy of pointing at a target.

The object of my invention is to provide equipment in which the target position is indicated with respect to a reference axis in a "telescope" view and the magnitude of the target representation is inversely proportional to range so the target representation indicates the direction and range of the target.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 is a circuit diagram and Figs. 2 and 3 are diagrams illustrating the operation.

Referring to Fig. 1 of the drawing, there is shown radio locating equipment having a directional antenna 1 connected to a transmitter 2 for transmitting pulses of radio waves at the desired repetition rate (e. g. 2000/sec.) and to a receiver 3 for echoes of the transmitted pulses. The antenna is supported at the upper end of a pedestal 4 rotatable about a vertical axis by an azimuth control (manual or automatic) indicated as hand wheel 5. The antenna is rotatable about a horizontal axis through the upper end of the pedestal by an elevation control (manual or automatic) indicated as hand wheel 6. The hands wheels 5 and 6 control the mean azimuth and elevation of the antenna with respect to the support on which the pedestal is mounted. The antenna axis is eccentric of the mean axis determined by the hand wheels 5 and 6 and the antenna is rotated about the mean axis by a motor 7 at a rate (e. g. 30 revolutions/sec.) relatively slow compared to the pulse rate of the transmitter so the antenna scans a cone centered on the mean axis. During each rotation of the antenna, a plurality of echoes (e. g. 2000/30) are received from each target which vary in strength with the angle between the target and the instantaneous antenna axis. Only if the target is on the mean axis of the antenna will all of the echoes be of the same strength since under this condition the angle between the target and the antenna axis will be constant throughout the scanning cycle. For all other target positions the strength of the target echoes will vary at the antenna scanning frequency. Not only do the target echoes vary in intensity at the scanning frequency, but the relation of the antenna position to the instantaneous value of the scanning frequency component of the target echoes serves as an indication of the direction the target is off line from the mean antenna axis. For example, if the target is to the right of the mean antenna axis, the target echoes will be a maximum when the antenna points to the right and a minimum when the antenna points to the left of the mean axis and will vary in magnitude sinusoidally between these values at intermediate positions. The magnitude of the scanning frequency component of the target echoes is an indication of the amount the target is off line of the mean axis and the phase is an indication of the direction.

To obtain the scanning frequency component of the echoes from a particular target, the output of the receiver, which contains all of the received signals including the transmitted pulses and echoes from other targets, is fed to a mixer 8 comprising devices 9 and 10 connected to a common plate resistance 11. The receiver output, which consists of negative signals corresponding to the transmitted pulses and echoes, is connected to the grid 12 of the device 9. The grid 13 of the device 10 is connected to a range pulser 14 controlled by a range control (manual or automatic) indicated as hand wheel 15 so as to supply a single negative pulse coincident with the echo from the desired target. This pulse is short relative to the time between pulses radiated by a transmitter 2 and may be of about the length of a radiated pulse. Only the echo received during this pulse is utilized to control the indication to be produced. Thus, this pulse may be referred to as the "gate" or "aperture" since it determines the aperture, or interval, of time during which the desired echo is received. In the mixer output appearing in the plate resistor 11, the target echo coincident with the aperture pulse appears as a positive voltage superimposed upon a positive voltage corresponding to the aperture pulse which is of greater magnitude than any other signals in the mixer output. The mixer output is fed to the grid 16 of a device 17 which is biased so that it draws current only during the aperture pulse and is unaffected by any other signal voltage in the mixer output since the other voltages are below the level of the aperture pulse voltage. The output of the device 17, which appears in a cathode resistor 18 shunted by a condenser 19, consists of a saw-tooth voltage having peaks corresponding to the magnitudes of the echoes coincident with the aperture pulse. The envelope of the saw-tooth voltage follows the target echo intensity and therefore varies at scanning frequency. It is important that the time constant of the resistance 18 and condenser 19 be fast enough so the peak condenser voltages can follow the envelope of the echoes. If the time constant is too long, the voltage on the condenser 19 will respond only to the larger echoes. If the time constant is too short, the maximum voltages on the condenser will follow the echoes but between echoes the condenser will discharge to a greater extent and will cut down the amount of the scanning frequency component in the envelope of the condenser voltage. It is better that the time constant err on the side of being too short. The device 17 with its associated resistance and condenser functions as an integrator or detector having an output corresponding to the envelope of the target echoes.

The scanning frequency component is segregated from the output of the device 17 in a regenerative filter comprising a multiple mesh network of resistances 20, 21, and 22 and condensers 23, 24, and 25 having an output terminal 26 connected to an amplifier 27. The amplifier output which apears across a variable plate resistance 28 is amplified and shifted 180 degrees in phase from the voltage at the terminal 26. The amplifier output is fed to a cathode follower 29 having a cathode resistance 30 with a terminal 31 connected to a terminal 32 at the input end of the filter circuit. If the filter circuit is made up of equal resistances and equal condensers related to the scanning frequency by the formula $$\text{Scanning frequency} = \frac{1}{2\pi\sqrt{6}RC}$$

a voltage of scanning frequency applied to the terminal 32 will be shifted in phase 180 degrees upon reaching the terminal 26 and will be attenuated to $\frac{1}{29}$ of its initial value. This 180-degree phase shift is obtained only for voltages of scanning frequency. If the amplifier 27 and cathode follower 29 are adjusted so that the voltage at the terminal 31 is slightly less than 29 times the voltage at the terminal 26, the voltage fed back to the terminal 32 will be in phase with the voltage at the terminal 32 and slightly less than that required to sustain oscillation at the scanning frequency. Under this condition the filter is sharply tuned to respond to voltages of the scanning frequency. The sharpness of the response is dependent on how close the amplification in the devices 27 and 29 approaches the attenuation in the filter network. The output of the device 17 is fed through a high resistance 33 to any convenient point on the filter network such as the center terminal 34 and the scanning frequency component of the output of the device 17 appears in the cathode resistor 30 of the cathode follower 29.

Part of the scanning frequency component is fed through a slider 35 on the cathode resistor to a push-pull amplifier comprising devices 36 and 37 having plate resistors 38 and 39 and a common cathode resistor 40. The slider 35 is connected to the grid 41 of the device 36 and the grid 42 of the device 37 is connected through a voltage divider 43 to the plate resistor 38 so as to apply a grid bias equal in magnitude and opposite in phase to the bias on the grid 41.

The amplifier output which appears across the plate resistors 38 and 39 is an alternating voltage of scanning frequency and is coupled through condensers 44 to the horizontal deflection plates 45 on a cathode ray tube 46. The terminal 31 on the cathode resistor 30 is connected to a 90-degree phase shift network comprising resistances 47 and 48 and condensers 49 and 50 of equal impedance at the scanning frequency. The voltage at terminal 51 of the 90-degree phase shift network is equal in magnitude to the voltage at the slider 35. The voltage at the terminal 51 is fed through a push-pull amplifier identical with that previously described and the amplifier output appearing in plate resistances 52 and 53 is coupled through condensers 54 to the vertical deflection plates 55 of the cathode ray tube. The voltages applied to the deflection plates 45 and 55, which are of equal magnitude and which differ in phase by 90 degrees, cause the beam of the cathode ray tube to be deflected in a circular sweep trace indicated by dotted line 56 on the viewing screen 57. The diameter of the sweep trace is proportional to the magnitude of the sweep voltages which consist substantially wholly of the scanning frequency component of the envelope of the target echoes.

Since the scanning frequency component of the envelope of the target echoes varies in magnitude and phase with the magnitude and direction of displacement of the target from the mean antenna axis, illumination of the sweep trace at a fixed time phase will cause a spot on the viewing screen displaced from the center of the screen in accordance with the target position. When the target lies on the mean antenna axis there is no scanning frequency component in the target echoes and the diameter of the circular sweep trace is zero. For this condition the target representation should appear at the center of the viewing screen. To obtain this result the beam deflection is adjusted by centering the voltages obtained from sliders 56 and 57 connected to the horizontal and vertical plates.

The illumination of a predetermined phase of the circular sweep trace is controlled by a blanking generator having input terminals 58 connected to a scanning frequency generator 59 driven by the scanning motor 7. The generator terminals are connected across the cathode grid circuit of a clipper 60 through diodes 61 and 62 arranged to block the positive half cycle of the scanning generator output. The negative half cycle of the scanning generator output is applied through the diode 61 to the grid 63 of the clipper which is biased off during the initial part of the negative half cycle and causes a square wave voltage to appear in the plate resistance 64 having positive peaks of substantially 180 degrees width at the scanning frequency. The leading and trailing edges of the voltage at the plate resistor 64 correspond respectively to the beginning and end of the negative half cycles of the scanning generator voltage. The voltage at the plate resistance 64 is fed through a differentiating circuit comprising a condenser 65 and the resistance 66 which produces positive and negative peaks coincident with the leading and trailing edges of the square wave voltage. The output to the differentiating circuit is connected to the grid of a normally non-conducting device 68 in parallel with the plate resistor 69 of a multivibrator comprising devices 70 and 71 connected to a common cathode resistor 72. The device 70 is normally conducting and the device 71 is biased off by the current flowing in the common cathode resistor. The negative peaks of the output of the differentiating circuit have no effect on the device 68. At the positive peaks of the output of the differentiating circuit the device 68 is biased on and the voltage drop due to the current flowing in the plate resistance 69 is applied through a condenser 73 to the grid 74 of the device 70 biasing it off and causing a sudden rise in voltage across its plate resistor 75. The interruption of current through the device 70 removes the negative bias on the device 71 which now conducts and produces a negative bias in the cathode resistance 72, holding the device 70 off. The device 70 remains off for an interval required for the condenser 73 to discharge through resistance 76 to a value sufficient to raise the bias on the grid 74 to the point at which the device 70 conducts. At this point the voltage across the plate resistance 75 drops and the device 71 is biased off by the current flowing in the cathode resistance 72. The voltage at the plate resistance 75 accordingly consists of a square pulse having its leading edge coincident with the beginning of the negative half cycle of the scanning generator voltage and having a width determined by the time constant of the condenser 73 and resistance 76. If the scanning frequency is 30 cycles per second, the width of the voltage pulse at the plate resistance 75 may be of the order of 100 microseconds. This voltage is applied to the grid 77 of the cathode ray tube, turning the beam on and causing illumination of the viewing screen for 3/1000 of the circular sweep trace.

In addition to providing a mark on the viewing screen indicating the target position with respect to the center of the screen, it is also desirable that the target representation provide an indication of the target range. This is accomplished by a high frequency oscillator 78 having a resistance 79 connected across a part of its resonant circuit. A portion of the voltage across the resistance 79 is fed through a slider 80 to an amplifier 81 having its output connected to the horizontal deflection plates 45 of the cathode ray tube. The slider is positioned through a connection with the range control 15 so that the voltage applied to the amplifier 81 is inversely proportional to range. The high frequency voltage applied to the horizontal deflection plates 45 accordingly has a magnitude inversely proportional to range. The frequency of this voltage is such that during the illumination of the viewing screen by the pulse from the blanking generator, a large number of cycles of the high frequency voltage is applied to the horizontal deflection plates, causing the beam to trace a horizontal line 82 on the viewing screen representing the target range. Because the line 82 simulates the wings of an airplane, the oscillator 78 and the associated equipment can be termed a "wing generator." Because the length of the line 82 increases as the target approaches the equipment, the representation of the target on the viewing screen is in the nature of a telescope view. The number of cycles applied to the deflection plates 45 from the oscillator 78 is not critical. For a blanking pulse of 100 microseconds the oscillator 78 may have a frequency of 1 megacycle.

The operation of the equipment is illustrated in diagrams of Figs. 2 and 3 in which line A of Fig. 2 represents the transmitted pulses and line B of Fig. 2 represents the receiver output. The receiver output includes signals 83 picked up directly from the transmitter and therefore coincident in time phase with the transmitted pulses and signals 84a, 84b, 84c representing target echoes which are spaced in time phase with respect to the transmitted pulses in accordance with the time of travel of the wave energy from the transmitter to the targets and back to the receiver. The receiver output also includes random noise voltages which are of irregular amplitude. The receiver output is fed to the mixer 8 together with an aperture pulse shown at 85 in line C of Fig. 2 which is adjusted by the range control 15 to coincide in time phase with the echo from one of the targets, for example the target corresponding to the echo 84a. In the mixer output indicated at line D in Fig. 2, the target echo 84a is superimposed upon a pedestal 85 corresponding to the aperture pulse 85 which raises the target echo to a higher level than any of the other signals in the mixer output. The mixer output also contains signals corresponding to the noise voltages and to the transmitted pulses 83 and the echoes 84b and 84c which have amplitudes less than the pedestal 85. The mixer output is fed to the integrator 17 which is biased on by signals having an amplitude less than the amplitude of the pedestal 85 but greater than any other possible signals appearing in the mixer output. The currents flowing in the integrator, indicated at line A in Fig. 3, are proportional to the instantaneous values of the echoes 84a from the target coincident with the aperture pulse, and the successive currents through the integrator vary with the instantaneous scanning position. In actual practice during each scanning revolution of the antenna there are of the order of 60 echoes from the desired target. For convenience only a few of these echoes are illustrated. As indicated by the dotted line the envelope of the echoes is a sine wave of scanning frequency. In the integrator output indicated at line B in Fig. 3, the successive echoes are converted to a sawtooth wave having peaks lying on the echo envelope. The integrator output is fed through the regenerative filter 20—32 and the phase shift network 47—51 to produce sine waves of scanning frequency displaced in phase by 90 degrees and corresponding in magnitude to the scanning frequency component of the echo envelope. The scanning frequency component of the echo envelope is indicated in line C of Fig. 3 and the scanning frequency component shifted in phase by 90 degrees is indicated in line D of Fig. 3. The scanning frequency components vary in magnitude with the amount the target is displaced from the mean antenna axis and vary in time phase with the target azimuth and elevation. When the target is centered on the mean antenna axis there will be no scanning frequency component in the target echoes. The scanning frequency waves indicated in lines C and D of Fig. 3 are fed through amplifiers to the horizontal and vertical deflection plates 45 and 55 of the cathode ray tube, producing a circular sweep trace having a diameter proportional to the amplitude of the waves and having a phase proportional to the phase of the waves. The grid 77 of the cathode ray tube is biased off except for a brief interval of the circular sweep trace controlled by the blanking generator synchronized from the scanning frequency generator 59 driven by the scanning motor 7. The blanking generator generates a narrow positive pulse coincident with the 180-degree point on the reference generator sine wave which biases the cathode ray tube grid on at this point and stroboscopically illuminates the sweep trace. The centering voltages are adjusted so that the point of illumination of the circular sweep trace corresponds on the viewing screen to the position of the target relative to the mean position of the antenna. The target representation is also provided with a horizontal trace simulating the wings of an airplane by a high frequency voltage applied to the horizontal deflection plates 45 from the wing generator 78—81. The amplitude of the wings is controlled by the range control 15 so that the length of the wings is inversely proportional to range. The target representation therefore increases in size as the range decreases and the viewing screen presents a telescope view of the target.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States, is:

1. In locating equipment utilizing wave energy from a target, a directional receiver, provisions for periodically varying the direction of response of the receiver to scan a field around a mean axis whereby the signals from a target vary with the instantaneous angular deviation of the directive axis of the receiver from the target, means for segregating the scanning frequency component of the signals, which varies in phase and magnitude with the direction and magnitude of the displacement of the target from the mean directive axis of the receiver, means for splitting the phase of said scanning frequency component to obtain circular sweep voltages for a cathode ray tube, and means for illuminating the sweep trace at a predetermined phase angle to obtain a spot representing the target position with respect to the mean axis of the receiver.

2. In locating equipment utilizing wave energy from a target, a directional receiver, provisions for periodically varying the direction of response of the receiver to scan a field around a mean axis whereby the signals from a target vary with the instantaneous angular deviation of the directive axis of the receiver from the target, means for segregating the scanning frequency component of the signals, which varies in phase and magnitude with the direction and magnitude of the displacement of the target from the mean directive axis of the receiver, means utilizing said component to produce a circular sweep trace on a viewing screen, and means for illuminating the sweep trace at a predetermined phase angle to obtain a spot representing the target position with respect to the mean axis of the receiver.

3. In locating equipment utilizing wave energy from a target, directional receiving means for periodically scanning a field around a mean axis whereby the relative signals from a target in the field vary with the angular deviation of the target from the instantaneous scanning position, means for integrating the received signals to obtain the envelope of the signals received during the scanning intervals, means for filtering the scanning frequency component from said envelope, means for effecting a 90-degree phase shift of said component, a cathode ray tube having horizontal and vertical deflection plates, one connected to said component and the other to said phase shifted component to obtain a circular sweep trace, means for illuminating a predetermined phase of the sweep trace to obtain a spot representing the relative position of the target with respect to said mean directive axis, and D. C. centering voltages for said plates.

4. In radio locating equipment utilizing wave energy from a target, directional receiving means for periodically scanning a field around a mean axis whereby the instantaneous signal from a target in the field varies in intensity with the instantaneous scanning position, means for obtaining an alterating voltage proportional to the envelope of the signals from the target during a scanning interval, means utilizing said voltage to provide a circular sweep trace, and means for illuminating a predetermined phase of said trace to obtain an indication of the position of the target with respect to said mean axis.

5. In locating equipment having a field of vision, means for producing circular sweep traces varying in diameter and phase with the coordinate position of a target from a point in said field of vision, and means for stroboscopically illuminating a predetermined phase of said sweep traces to obtain a representation of the target position.

DONALD E. NORGAARD.